United States Patent [19]

Parr

[11] Patent Number: 5,029,932
[45] Date of Patent: Jul. 9, 1991

[54] FOLDABLE VEHICLE ROOF

[75] Inventor: Alan Parr, Utica, Mich.

[73] Assignee: Valckar Co., Troy, Mich.

[21] Appl. No.: 513,835

[22] Filed: Apr. 24, 1990

[51] Int. Cl.$^5$ ............................................... B60J 7/03
[52] U.S. Cl. ..................................... 296/107; 296/108
[58] Field of Search ...................... 296/107, 108, 99.1

[56] References Cited

U.S. PATENT DOCUMENTS

| | | | |
|---|---|---|---|
| 3,378,298 | 4/1968 | Wingen | 296/107 |
| 3,536,354 | 10/1970 | Ingram | 296/107 |
| 3,823,977 | 7/1974 | Fioravanti | 296/107 |
| 4,165,122 | 8/1979 | Bertone | 296/107 |

Primary Examiner—Robert R. Song
Attorney, Agent, or Firm—Gifford, Groh, Sprinkle, Patmore and Anderson

[57] ABSTRACT

Disclosed is a foldable rear top particularly advantageous for use with vehicles having a "fast back" configuration or vehicles having a roll bar or T-top arrangement. The foldable top includes a rigid center panel and a pair of side panels positioned to enclose the rear compartment of the vehicle. The center panel is foldable downwardly pivoting from a position near the rear of the vehicle. The folding mechanism also includes means to simultaneously fold the side panels inwardly underneath the center panel as the top is lowered from the raised position.

19 Claims, 5 Drawing Sheets

FOLDABLE VEHICLE ROOF

FIELD OF THE INVENTION

I. Background of the Invention

This invention relates to a foldable roof for a vehicle and, more particularly, to a solid foldable roof for an automobile.

II. Description of the Prior Art

Foldable convertible tops for vehicles are well known in the art. Typically, these convertible tops have a foldable frame supporting a flexible or soft cover. The frame and cover may be folded and retracted into a storage area located behind the seats of the vehicle.

Also known are "flip top" type tops which are rigid and retractable from a normal position extending over the seats to a storage position within the trunk of the automobile. Such arrangements require a large volume of space in the trunk to accommodate the top and lowering mechanism.

The rear portions of many vehicles are presently being designed and produced in a "fast back" configuration with an aerodynamically shaped rear section. The rear section has a portion extending rearwardly and downwardly from a roof to the rear end of the vehicle. These vehicles may be equipped with a roll bar or "T-top" over the passenger seats. These types of tops frequently have panels which are removable to provide an opening over the passenger compartment. It would be advantageous to open the rear portion of such vehicles to provide an opening behind the passengers. Thus, the vehicle may be provided with a substantially open vehicle.

SUMMARY OF THE INVENTION

Applicant therefore, discloses a foldable rear top which is particularly advantageous for use on vehicles having a "fast back" configuration or with vehicles having a roll bar or a T-top arrangement. The foldable top has a rigid center panel and a pair of side panels positioned to enclose a rear compartment of the vehicle. The center panel extends between a rear edge of a roof or a roll bar and a rear end of the automobile when in the raised position. The pair of side panels extend from the center panel to the rear side panels of the vehicle. A folding mechanism is mounted beneath the center panel to permit the center panel to pivot downwardly at the rear of the vehicle to a lowered position. The folding mechanism also folds the side panels inwardly beneath the center panel as the center panel is lowered. In the lowered position, the top is stored in a generally horizontal plane above the rear compartment.

The folding mechanism is supported on a platform in the rear compartment and has a pivot arm to move the rear edge of the center panel upwardly and rearwardly when the top is being folded to properly position the top in the lowered position. The folding mechanism of the top has pairs of springs to facilitate the raising and lowering of the top. In the lowered position, the top is positioned to provide the appearance of a "spoiler".

DESCRIPTION OF THE PREFERRED EMBODIMENTS

Figure 2:
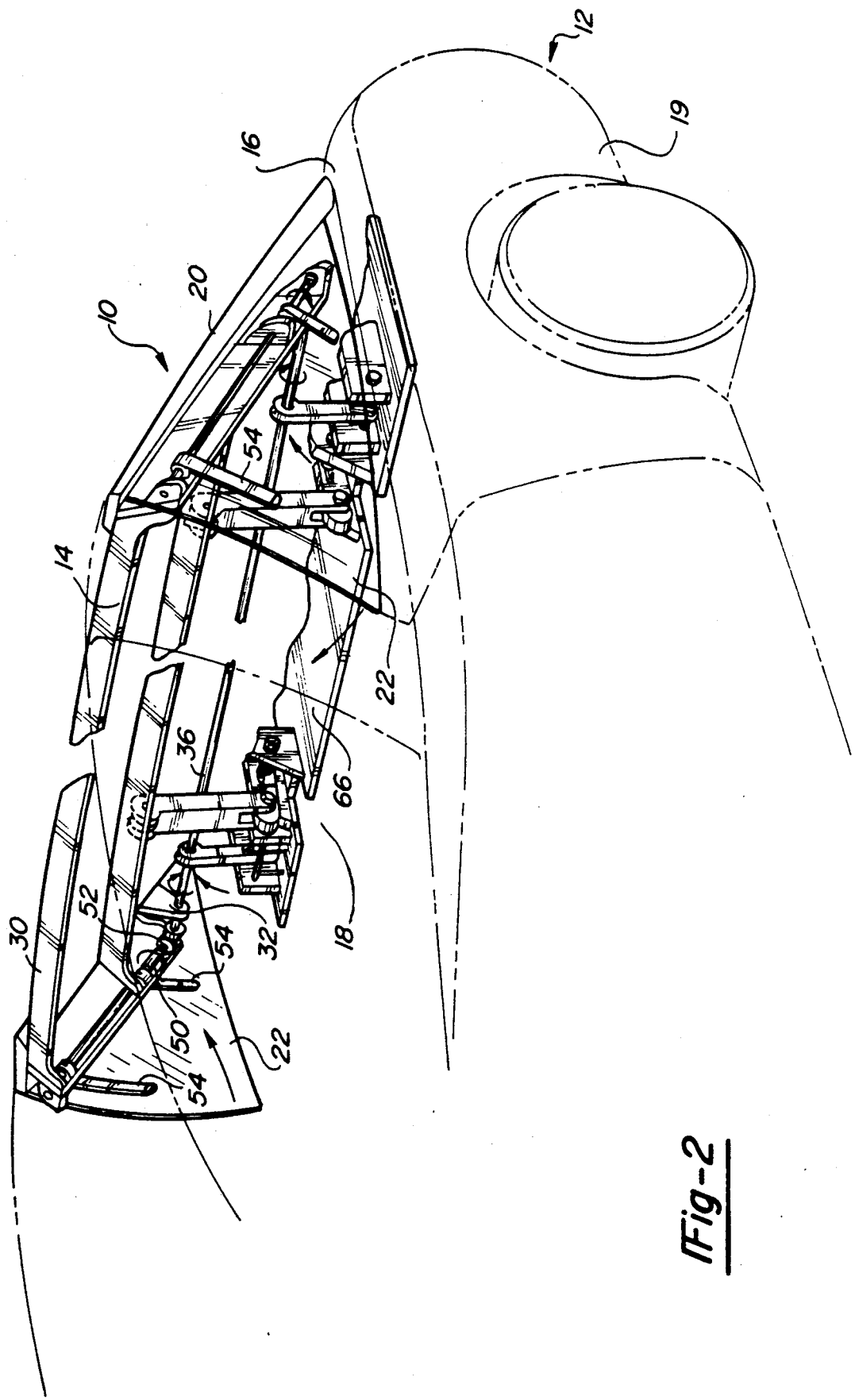
FIG. 2 is a fragmented prospective view of the foldable top according to the invention shown mounted upon the rear portion of an automobile.
Figure 7:
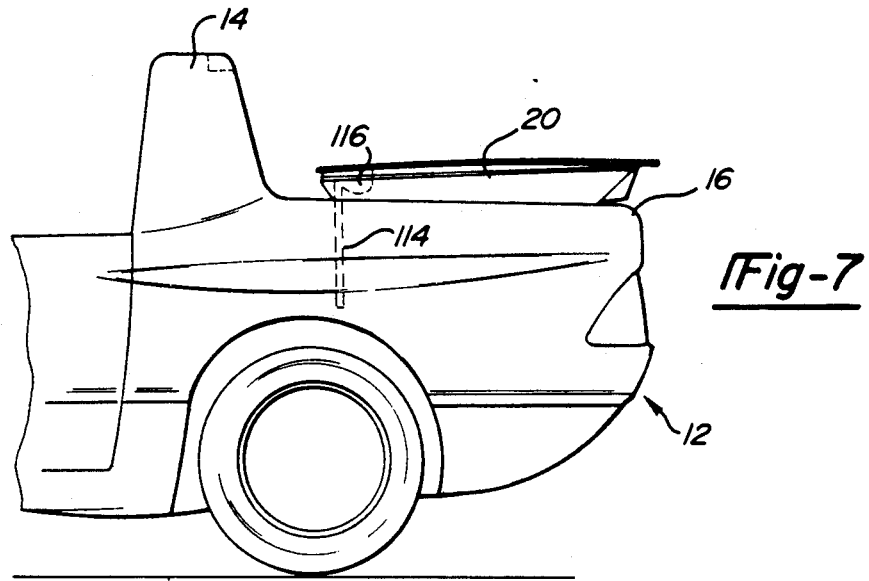
FIG. 7 is a partial side view of an automobile having a foldable top according to the invention in the lowered position.
Figure 8:
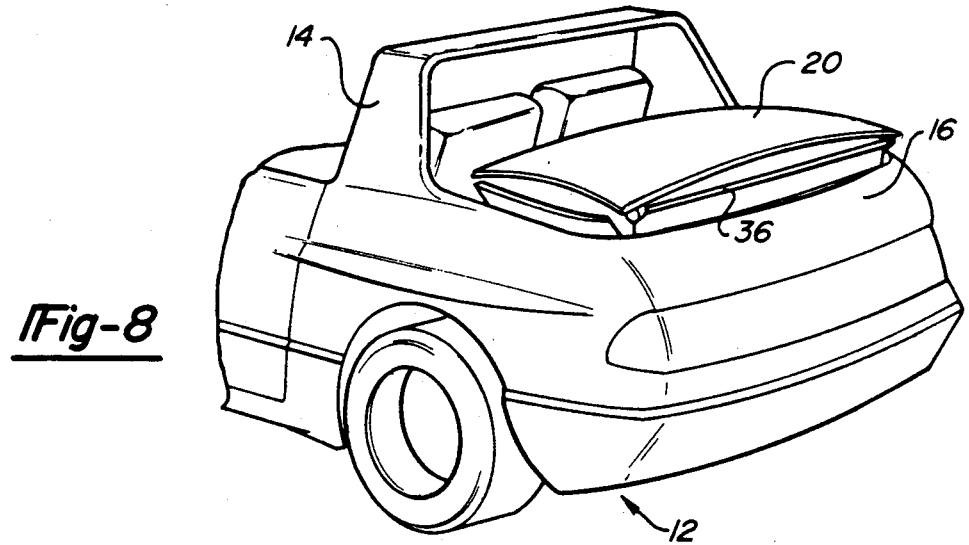
FIG. 8 is a perspective view of the rear side and end portions of an automobile having a foldable top according to the invention in the lowered position.

A rigid foldable top 10 according to the invention is shown in FIG. 2 in a raised position on an automobile 12. The foldable top 10 is suitable for use on a wide variety of vehicles, and it is particularly advantageous for use with automobiles having a roll bar 14 or T-top type of roof. Such vehicles have an opening or removable panels over the seats of the automobile and in front of the roll bar 14. The foldable top 10 may be folded from a raised position shown in FIG. 2 to a lowered position as shown in FIGS. 7 and 8 to provide a generally open top for the vehicle.

As shown in FIG. 2, the foldable top 10 extends between a rear portion of the roll bar 14 to a rear end 16 of the automobile over a trunk or rear compartment 18 of the automobile. The rear compartment 18 extends behind the seats (not shown) and between rear side panels 19 of the automobile.

Figure 4:
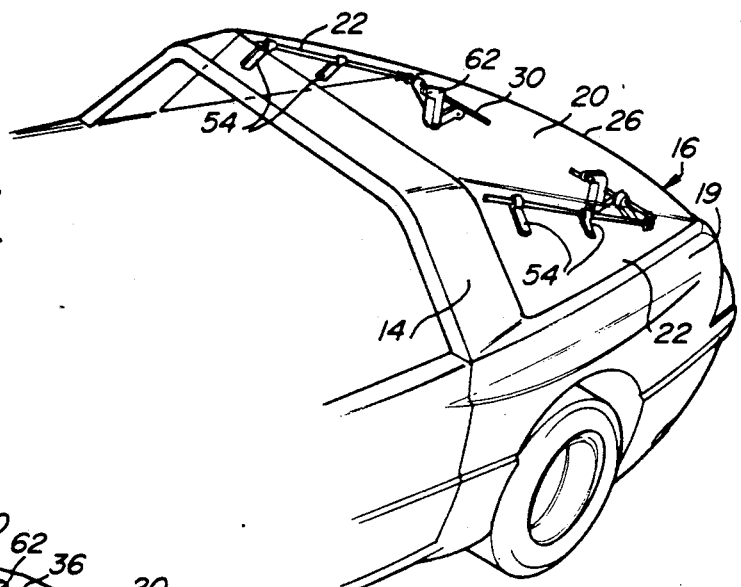
FIG. 4 is a perspective view of the rear of the automobile having the foldable top according to the invention in a raised position.
Figure 5:
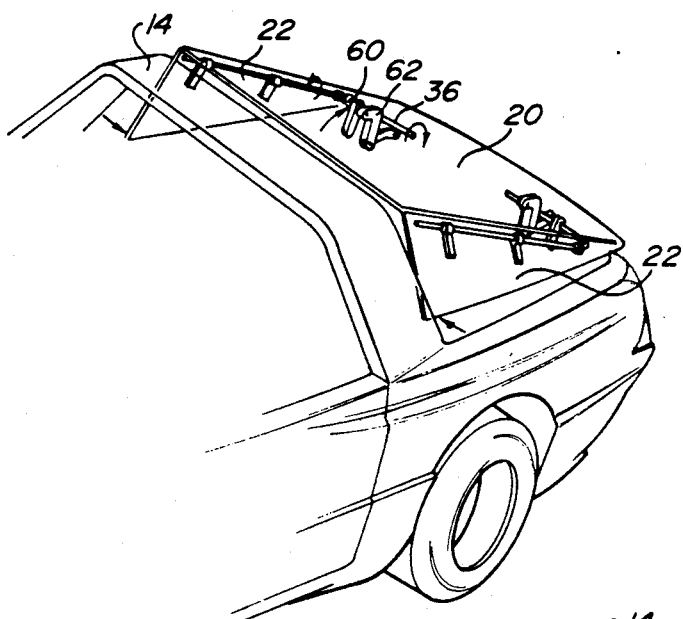
FIG. 5 shows a perspective rear view of an automobile showing the foldable top according to the invention as it is moved between a raised position and a lowered position.
Figure 6:
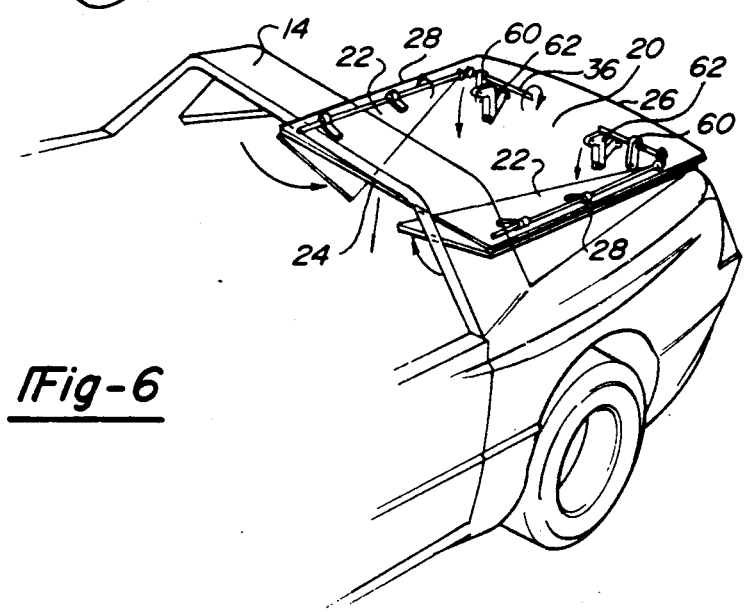
FIG. 6 is a perspective view of the rear of an automobile having a foldable top according to the invention in the lowered position.

As shown in FIGS. 4-6, the foldable top 10 has a rigid center panel 20 and a pair of side panels 22 which are pivotally mounted to the center panel 20. As set forth more fully below, the center panel is movable from the raised position by a folding mechanism. The folding mechanism also folds the side panels 22 under the center panel 20 as the top is being lowered. The center panel 22 is generally rectangular in shape, having a front edge 24 and a rear edge 26 and a bowed or curved contour extending between a pair of side edges 28.

As best shown in FIG. 4, the rear edge 26 is formed to extend across the rear of the automobile to mate with the deck or rear end 16 of the automobile when the top 10 is in the raised position. The rear edge 26 and bowed contour of the center panel produce a spoiler-like appearance when the top is in the lowered position as shown in FIGS. 7 and 8.

Figure 1:
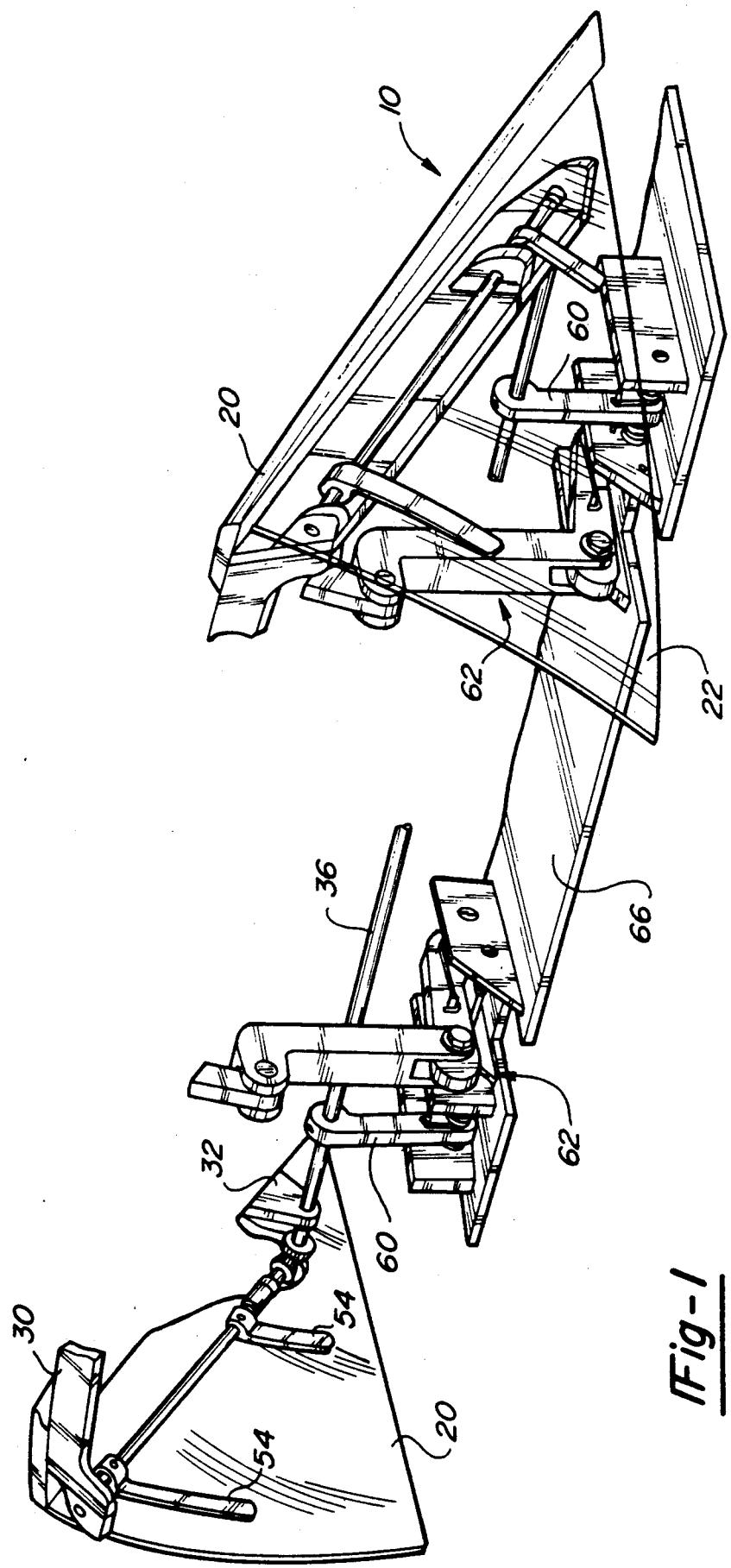
FIG. 1 is a fragmented partial view of the foldable top according to the invention.

The center panel 20 may be formed of a rigid, formable material such as fiberglass, metal, or composite material. In the preferred embodiment, the center panel is formed of a transparent material to permit rearward visibility. Alternatively, the center panel may be formed of metal or composite material which is opaque and a clear or translucent panel may be inset into the center panel to provide visibility. As shown in FIGS. 1 and 2, it may be necessary to mount the center panel on a frame 30 to provide rigidity to the center panel and support for the folding mechanism.

Each of the pair of side panels 22 is dimensioned to extend from the center panel 20 to the rear panels 19 of the automobile as best shown in FIG. 4. In the preferred embodiment, the side panels are formed of a clear material such as plastic and have a pair of straps 54 fixedly mounted to an inner side of each side panel for mounting as set forth below.

Figure 3:
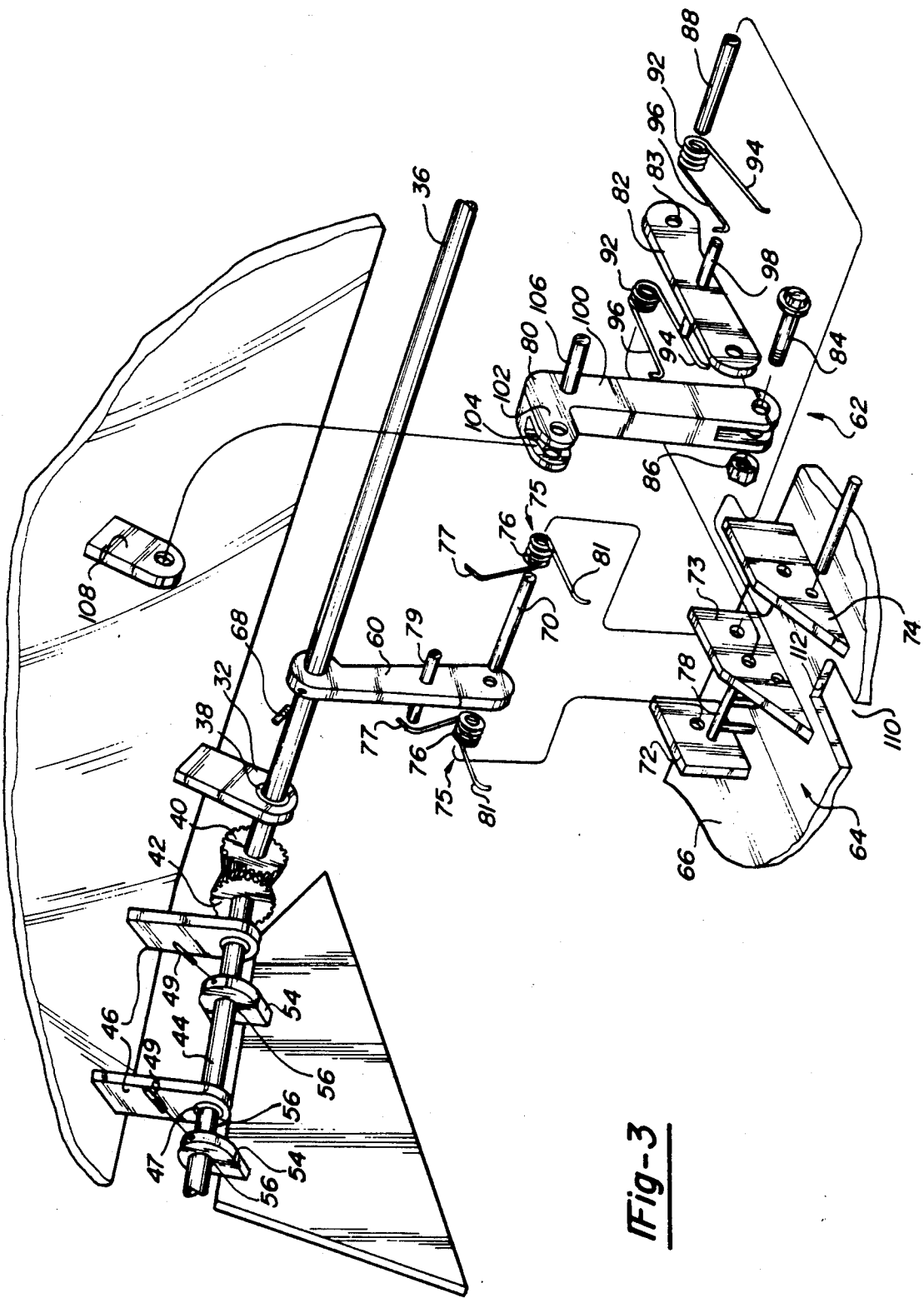
FIG. 3 is a exploded view of the foldable top according to the invention.

The pair of side panels 22 and the center panel 20 are movable between the raised position and the lowered position by the folding mechanism as best shown in FIGS. 1 and 2. The folding mechanism includes a pair of arms 32 extending inwardly from an underside of the center panel 20 for pivotally supporting a rod 36. The rod 36 extends transversely beneath the rear portion of the center panel. As shown in FIG. 3, a conventional roller bearing 38 is mounted in a bore adjacent a free end of each of the arms 32 to permit rotation of the arms and center panel about the rod 36. The rod, thus, acts as an axis of rotation for the center panel 20 when the top is moved between the raised and lowered positions.

Affixed on each end of the rod 36 is a bevel gear 40, as shown in FIG. 3. Each bevel gear 40 is aligned to mesh with a bevel gear 42 mounted to an end of each of a pair of side rods 44. Each of the pair of side rods 44 is pivotally mounted to a pair of arms 46 extending from the underside of the center panel 46. Each pair of arms 46 extends adjacent the side edge 28 of the center panel. Each of the arms 46 has a bearing 47 mounted in a bore in the free end of the arm to permit rotation of each side rod 44 within the pair of arms 46. The pair of arms 46 may be incorporated as part of the frame 30 as shown in FIG. 2.

Each side rod 44 is positioned to support one of the pair of side panels 22. The side panels are supported on the side rods by the pairs of straps 54. Each strap has a bore 56 in one end for receiving the side rod 44. A bore 56 is formed in one end of each strap 54 to accept the side rod 44. The side rod 44 is fixedly mounted to the strap 54 in a conventional manner, such as a set screw 49, as shown in FIG. 3, or a key and keyway. When the center panel 20 is lowered, the center panel 20 pivots about the pivot rod 36 and the side rods 44 supporting the side panels 22 are rotated by movement of the bevel gear 42 about the bevel gear 40 of the pivot rod 36. In this manner, the side panels are folded inwardly beneath the center panel as shown in FIGS. 4-6.

Because the side rods form the axis of rotation for the side panels it is necessary to position the side rods properly with respect to both the edges of the center panel and side panel. If the side edges of the center panel are not parallel, it may be necessary to provide the side rod 44 a conventional swivel joint connection 50 and an extension rod 52 supporting the bevel gear 42, as shown in FIG. 2. In this manner, the bevel gear 42 may be maintained in normal relationship with the bevel gear 40 of the pivot rod 36 and the side rod 44 may be angled with respect to the extension rod 50 to establish a desired pivot axis for the side panels 22.

As shown in FIGS. 2 and 3, the folding mechanism also includes a pair of pivot arms 60 and linkage 62 which are pivotally mounted in a pair of brackets 64 supported on platform 66. The platform 66 is mounted transversely across the rear compartment 18 beneath the pivot rod 36. The platform is formed of any suitable rigid material such as metal or composite material. Each bracket 64 includes three plates 72, 73 and 76 extending upwardly from the platform.

As best shown in FIG. 3, one end of each pivot arm 60 is fixed to the pivot rod 36. The pivot rod is fixed within the pivot arm to prevent rotation of the pivot rod in a suitable manner, such as a set screw 68 (FIG. 3). The other end of the pivot arm is mounted to pivot on a pin 70 extending between the first plate 72 and the second plate 73 of the mounting bracket 64.

A pair of torsion springs 75 are mounted on the pin 70. Each spring has a pair of ends and a coil 76. The pin 70 extends through each coil 76 and one end 77 of each spring is disposed to engage a peg 79 extending from the pivot arm and the opposite ends 81 engage a stop 78. The springs are mounted to be compressed when the top is in the raised position. The stop 78 is mounted transversely between the first plate 72 and second plate 73 to prevent this pivot arm from over pivoting forward and maintaining the top in proper position when raised.

The pivot arms 60 are directed rearwardly by the springs when the top is lowered. When the top is lowered, the rearward movement of the pivot arm 60 acts to raise and move rearwardly the pivot rod 36 and rear edge 26 of the center panel. This movement properly positions the top and permits sufficient distance to store the top behind the roll bar or T-top in a horizontal alignment above the rear compartment of the vehicle.

As shown in FIG. 3, the center panel is also guided by the linkage 62 which includes an elbow arm 80 and a link bar 82. The elbow arm is pivotally connected to one end of the link bar 82 by a suitable means such as bolt 84 and nut 86. An other end of the link bar 82 has a bore 83 for accepting a pin 88 extending between the second plate 73 and a third plate 74. A pair of torsion springs 92 are mounted on the pin 88. One arm 94 of each pair extends to contact the platform 66 and an other arm 96 extends to contact a peg 98 affixed to the link bar 82. Thus, the springs 92 are compressed when the link arm pivots downwardly about the pin 88.

An upright portion 100 of each elbow arm extends upwardly from the bolt 84 connection with the link bar 82 to a connecting portion 102 extending normally to the upright portion 100. The connecting portion 102 has a bore 104 to accept a pin 106 to pivotally mount each of the pair of elbow arms 80 to an ear 108 extending from the underside of the center panel. The ear may extend from the frame 30 or be mounted directly to the center panel.

When the center panel 20 is lowered the elbow arm directs the link bar 82 to pivot downwardly about the pin 88 into a recess 110 formed in the platform. When the link bar 82 reaches a back edge 112 of the recess, the linkage and the center panel are stopped from further movement rearwardly, thereby establishing the lowered position. As shown in FIG. 6, the center panel 20 is supported in position by the linkage 62, pivot arm 60, and pivot rod 36. The pair of torsion springs 92 are compressed when the top is lowered. Compression of the springs 92 provides a biasing force to assist in raising the top.

As shown in FIG. 7, a support post 114 may be provided in the rear compartment to extend upwardly beneath the front edge of center panel 20 to support the center panel when the top is in the lowered position. A latching mechanism 116 may be mounted to the underside of the center panel for engagement with the support post 114 when the top is in the lowered position and with the roll bar 14 when the top is in the raised position.

OPERATION

When the top is lowered from the raised position, the latching mechanism 116 is opened and the center panel is pushed rearwardly. This rearward force operates to rotate the pivot arms 60 which raise and move the pivot rod 36 and rear portion of the center panel 20 upwardly and rearwardly over the rear portion of the vehicle.

While the center panel is moving rearwardly, the linkage directs the front portion of the panel downwardly, thereby rotating the center panel about the pivot rod 36 to rotate the bevel gears 42 of the side rods 44 about the bevel gears 40 of the pivot rod 36. This movement causes the side rods 44 to rotate and fold the side panels 22 inwardly, as shown in FIGS. 4–6. The top moves downwardly until the center panel is stopped by linkage 62 and support post 114 where it may be latched into the lowered position.

To raise the top, the latching mechanism 116 is released from the support post 114 and the front edge of the center panel 120 is lifted. The biasing force of the torsion springs 92 of the linkage assist in raising the center panel of the top. As the center panel moves upwardly, the pivot arms 60 swing forwardly to bring the rear edge of the center panel into mating position upon the rear deck or rear end of the vehicle and the side panels are unfolded outwardly. Once the top is raised, the latching mechanism may be engaged with the roll bar to secure the top in position.

When in the lowered position, the top is compactly stored in position over the rear compartment. The curvature of the rear edge of the center panel extends over the rear deck or the rear end of the vehicle and produces a spoiler-like appearance, as shown in FIGS. 7 and 8. It is also contemplated that a motor could be used to assist in raising and lowering the top.

Having thus described my invention, many modifications thereto will become apparent to those skilled in the art to which it pertains without deviation from the spirit of the present invention as defined by the scope of the appended claims.

I claim:

1. A top for a vehicle having a rear compartment comprising:
   a center panel pivotally attached to said vehicle;
   means for pivotally attaching said center panel to said vehicle, said means for attaching operable to permit said center panel to move between a raised position to a lowered position extending over said rear compartment;
   a pair of side panels movably mounted to said center panel;
   means for folding said side panels, said means for folding operable to fold said pair of side windows in response to movement of said center panel, said means for folding said side panels further having a pair of side rods, each of said pair of side rods fixed to a respective one of said pair of side panels, and means for pivoting said rods to fold said side panels inwardly beneath said center panel.

2. The top as claimed in claim 1 wherein said means for attaching further comprises a pivot rod disposed beneath a rear portion of said center panel.

3. The top as claimed in claim 1 wherein said means for attaching further comprises means for raising a rear portion of said center panel when said center panel is moved between said raised position and said lowered position.

4. The top as claimed in claim 1 wherein said means for attaching further comprises means for supporting said center panel in a position extending in a generally horizontal alignment over said rear compartment when said top is in said lowered position.

5. The top as claimed in claim 1 wherein said means for attaching comprises means for biasing said center panel to assist in positioning said center panel from said lowered position to said raised position.

6. The top as claimed in claim 3 wherein said means for raising said rear portion further comprises a platform mounted in said rear compartment and a pair of pivot links pivotally moveably mounted to said center panel;
   means for moving said center panel between said raised position and a lowered position where said center panel is aligned in generally horizontal direction;
   mans for folding said side panels when said center panel is in said lowered position.

7. The top as claimed in claim 4, wherein said means for supporting further comprises a guide linkage, said linkage mounted to said center panel.

8. The top as claimed in claim 7 further comprises a platform mounted within said rear compartment and said guide linkage further comprising a link pivotally mounted to said platform.

9. The top as claimed in claim 1 wherein said center panel is translucent.

10. A top for a vehicle having a roof portion, a rear end and a rear compartment extending therebetween, said top comprising;
    a center panel having a front portion and a rear portion, said center panel extending between said roof portion and said rear end when said top is in a raised position;
    a pair of side panels mounted to said center panel;
    means for moveably attaching said center panel to said rear end of said vehicle, said means for attaching operable for movement of said center panel between said raised position and a lowered position; said means for attaching further having means for raising a rear portion of said center panel when said center panel is moved from said raised position to said lowered position, said means for attaching further having a pivot rod and at least two pivot links, said pivot rod extending in a direction normal to a longitudinal axis of said vehicle and pivotally mounted to said center panel, each of said pivot links having one end mounted to said pivot rod and an opposite end mounted to a platform within said rear compartment of said vehicle, said center panel pivoting about said pivot rod to generally horizontal alignment when said center panel is moved to the lowered position.

11. The top as claimed in claim 10 wherein said pivot rod is disposed beneath a rear portion of said center panel.

12. The top as claimed in claim 10 wherein said means for attaching further comprises means for supporting said center panel in a position extending in a generally horizontal alignment over said rear compartment when said top is in said lowered position.

13. The top as claimed in claim 10 wherein said means for attaching comprises means for biasing said center panel to assist in positioning said center panel from said lowered position to said raised position.

14. The top as claimed in claim 10, wherein said means for attaching comprises a means for folding said side panels inwardly beneath said center panel, said means for folding having a pair of side rods, each of said pair of side rods fixed to a respective one of said pair of side panels.

15. The top as claimed in claim 10 wherein said means for raising said rear portion further comprises said at least two pivot links pivotally mounted to said platform; and means for folding said side panels when said center panel is moved to said lowered position when said center panel is in said lowered position.

16. The top as claimed in claim 12, wherein said means for supporting further comprises a guide linkage, said linkage mounted to said center panel.

17. The top as claimed in claim 16 further comprises a platform and said guide linkage further comprising a link pivotally mounted to said platform.

18. A top for a vehicle having a rear deck and a pair of rear walls, said top comprising:

a center panel having a rear portion having a rear edge extending in a direction normal to a longitudinal axis of said vehicle;
   means for attaching said center panel to said vehicle; said means for attaching selectively operable to move said center panel between a raised position and a lowered position; and
   means for supporting said center panel in a generally horizontal alignment when in said lowered position said means for supporting operable to position said read edge of said center panel in a spaced apart relationship over said deck of said vehicle whereby said center panel is positioned to present a spoiler-like appearance.

19. The top of claim 18, wherein said rear edge has a curvature defined by the intersection of said center panel with said rear end of said vehicle when said center panel is in said raised position.

* * * * *

UNITED STATES PATENT AND TRADEMARK OFFICE
CERTIFICATE OF CORRECTION

PATENT NO. : 5,029,932
DATED : July 9, 1991
INVENTOR(S) : Alan Parr

It is certified that error appears in the above-identified patent and that said Letters Patent is hereby corrected as shown below:

Column 4, Line 62, after "of", insert --the--.

Column 6, Claim 6, line 19, at beginning of line, delete "mans" and insert --means--.

Column 8, Claim 18, line 2, after "rear", insert --side--.

Column 8, Claim 18, Line 13, delete "read" and insert --rear--.

Signed and Sealed this

Fifteenth Day of December, 1992

*Attest:*

DOUGLAS B. COMER

*Attesting Officer*     Acting Commissioner of Patents and Trademarks